Oct. 2, 1923.

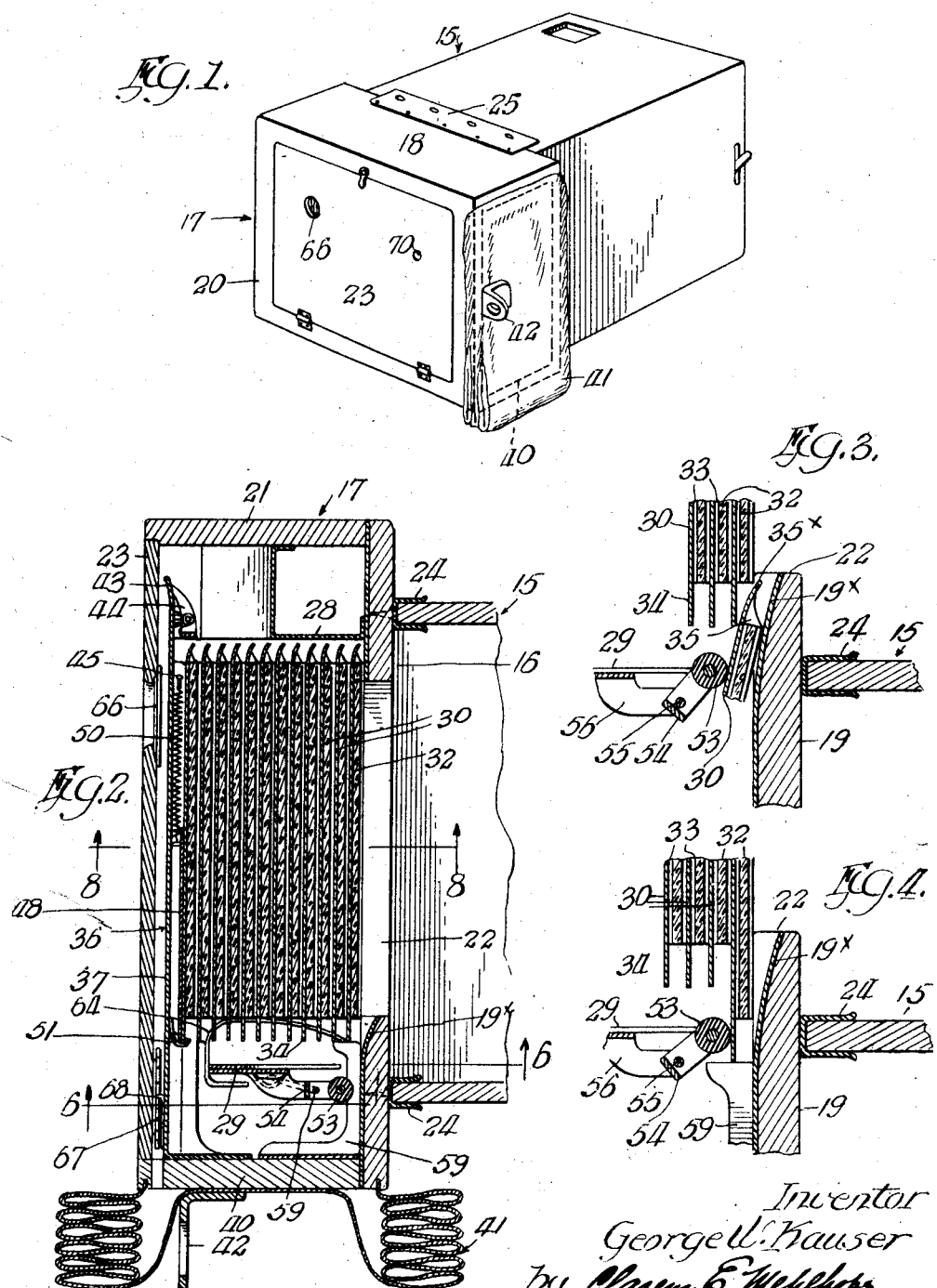

G. W. KAUSER

CAMERA

Original Filed April 3, 1920    4 Sheets-Sheet 2

1,469,273

Inventor
George W. Kauser
by Clarence E. Mehlhope
Atty.

Oct. 2, 1923.
G. W. KAUSER
CAMERA
Original Filed April 3, 1920    4 Sheets-Sheet 3
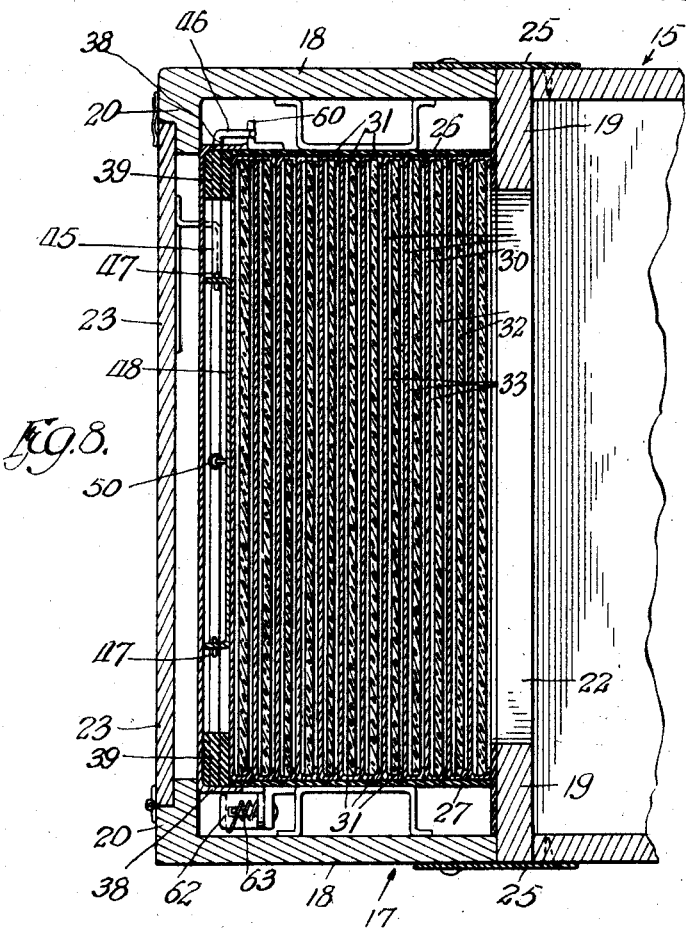
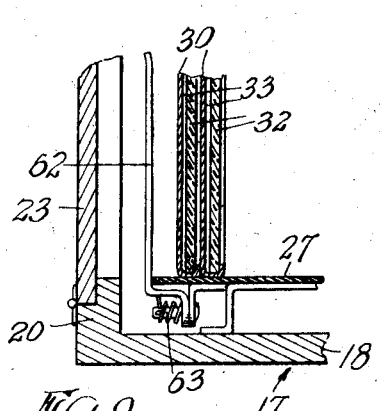
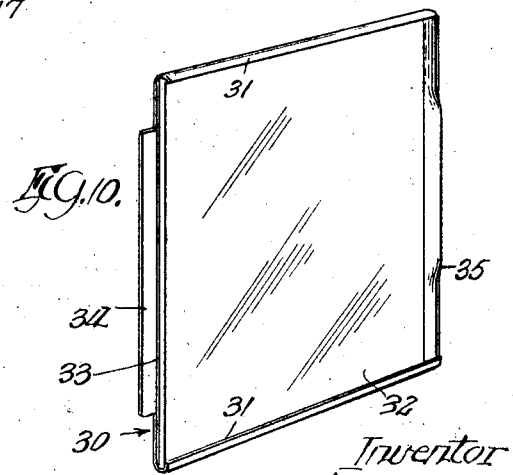
Inventor
George W. Kauser Oct. 2, 1923.

G. W. KAUSER

CAMERA

Original Filed April 3, 1920   4 Sheets-Sheet 4

1,469,273

Inventor
George W. Kauser
by Clarence E. Mehlhope
Atty.

Patented Oct. 2, 1923.

1,469,273

UNITED STATES PATENT OFFICE.

GEORGE W. KAUSER, OF CHICAGO, ILLINOIS; ELSIE BUCHAN KAUSER ADMINISTRATRIX OF SAID GEORGE W. KAUSER, DECEASED.

CAMERA.

Original application filed April 3, 1920, Serial No. 370,985. Divided and this application filed March 5, 1921. Serial No. 449,677.

*To all whom it may concern:*

Be it known that I, GEORGE W. KAUSER, a citizen of the United States, and a resident of Chicago, in the county of Cook and State of Illinois, have invented certain new and useful Improvements in Cameras; and I do hereby declare that the following is a full, clear, and exact description thereof, reference being had to the accompanying drawings, and to the letters of reference marked thereon, which form a part of this specification.

This invention relates to improvements in cameras, and consists of the matters hereinafter described and more particularly pointed out in the appended claims.

The object of the invention is to provide a novel construction for changing the plates in a camera wherein the plates are retained in a magazine in the back part of the camera,—this application being a division of an application filed by applicant on April 3rd, 1920, Serial No. 370,985.

The several advantages of my novel plate changing device will appear and will be specifically pointed out as I proceed with my specification.

In the drawings:—

Figure 1 is a perspective view of an ordinary box camera to which my improved plate changer has been applied.

Figure 2 is a longitudinal horizontal section through the magazine casing and plate changing device.

Figures 3 and 4 are detail views, on an enlarged scale, of parts shown in the lower right hand corner of Figure 2.

Figure 8 is a longitudinal, vertical section through said casing and plate changing device, on an enlarged scale, the plane of the section being indicated by the line 8—8 of Figure 2.

Figure 9 is a detail view of the parts shown in the lower left hand corner of Figure 8.

Figure 10 is a perspective view of a sensitized-plate holder, with a sensitized plate therein.

Figure 5:
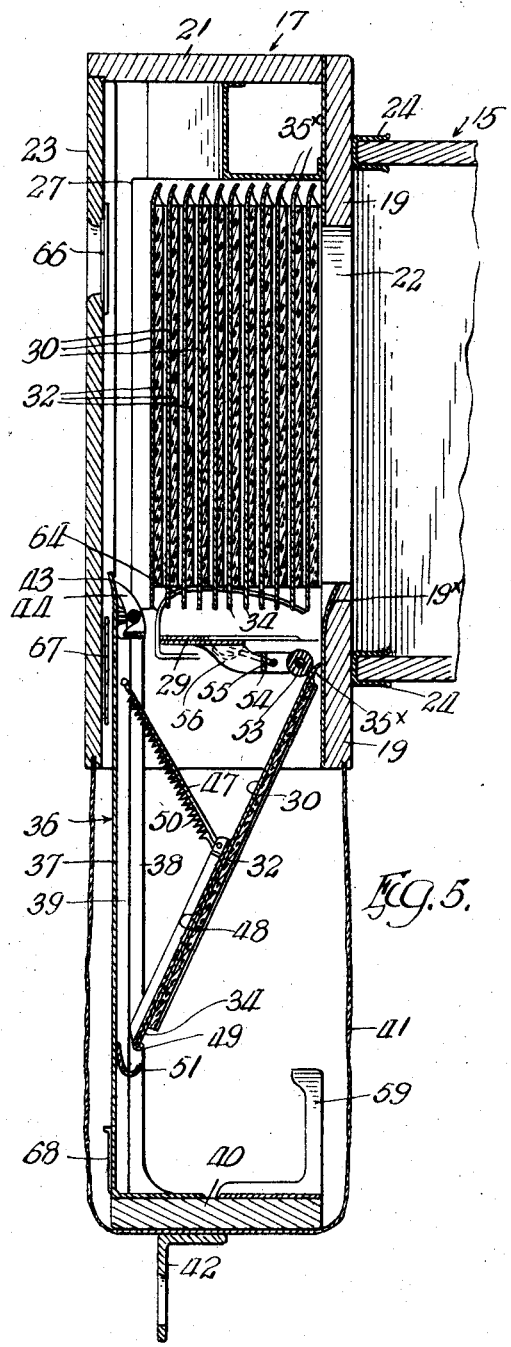
Figure 5 is a view similar to Figure 2, but with several of the parts in a changed position.

My improved plate changing device is capable of use with any magazine camera, as for example, with the series picture, reflex camera, described in the application above referred to. In the accompanying drawings it is shown embodied in a unitary magazine structure adapted to be applied to the ordinary box camera.

15 indicates the camera box, which in this case is without the usual plate holder, being open at the rear end as at 16. 17 indicates a magazine casing which is attached to said open end of the camera box in any convenient manner. As shown, the magazine casing is of the same height as the camera box, but extends beyond the sides of said box.

Said casing has top and bottom walls 18, 18, front and rear walls 19, 20, respectively and an upright side wall 21,—the other upright side of the casing being open but being adapted to be closed by an end member of the plate-changer as will presently appear. In the front wall 19, is an exposure opening 22, which opens into the camera box when the casing is attached to it, as shown in Figure 2. The rear wall 20 has an opening which is normally closed by a light-proof door 23, hinged along its bottom edge to the casing, to open downwardly.

On the front wall 19, of the casing, at each side of the exposure opening 22, are secured upright channel bars 24 which embrace the rear edges of the side walls of the camera box. To the top and bottom walls 18 of the casing are secured plates 25, which overlap the top and bottom walls of the camera box, and which are attached thereto by screws or the like, as shown in Figure 1. Thus the casing is secured to the camera in such manner as to prevent the entrance of light.

The magazine proper consists of an open frame having top and bottom walls 26, 27, respectively, and left and right hand side walls 28 and 29 respectively, all of which are spaced inwardly from the corresponding walls of the casing. The left hand wall is attached to the adjacent wall of the camera casing and holds the magazine frame in position with the rear of the frame spaced from the rear door 23 and with the front ends of its top and bottom walls 26, 27, abutting against the front wall 19 of the casing 17.

The magazine frame is designed to hold a plurality of loaded plate holders or septums, as for example, twelve. 30 indicates the septums (see Fig. 10). Each septum is a rectangular piece of sheet metal, the top and bottom margins of which are bent forwardly and downwardly to provide oppositely facing flanges 31, said flanges defining grooves to receive the top and bottom edges of a sensitized glass plate 32. The septum is faced with a sheet of paper 33, to prevent scratching of the sensitized plate as it is inserted into the grooves from the left hand margin of the septum, and has a marginal extension 34 at one side for the purpose of handling it. (See Figure 10.) At the opposite side, it has a forward extending flange 35, which acts as a stop for the sensitized plate when it is inserted into the septum. The flange 35 is curved forwardly between its top and bottom as indicated at 35ˣ (see Figures 2, 3 and 5.) The septums are provided on their backs with numerical characters (see Figure 11) to indicate their order of succession in the magazine.

Figure 12:
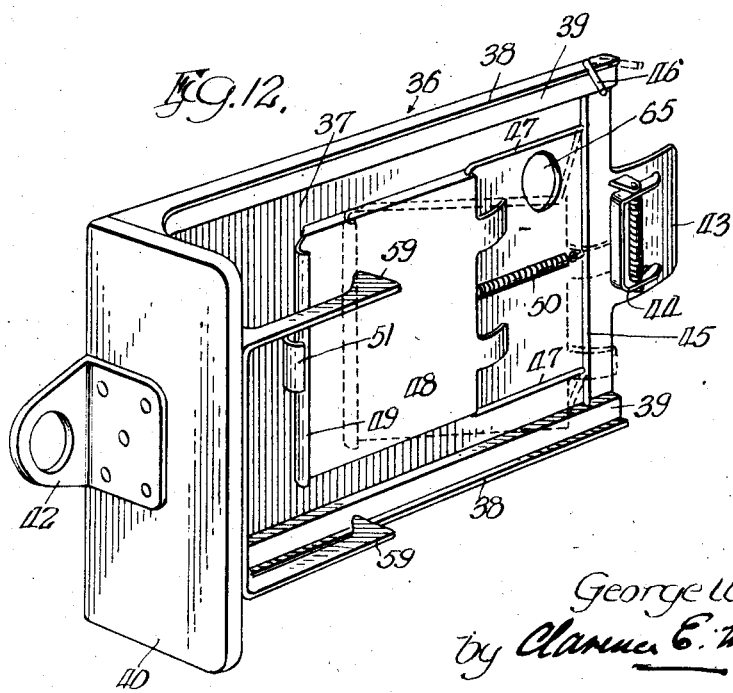
Figure 12 is a perspective view of my improved plate changing device.

At the back of the casing 17, in the space between the rear door 23 and the rear end of the magazine frame, is located a slidable plate-changer 36. (See Figures 2 and 12.) This consists of a rectangular plate or body 37 having forwardly extending top and bottom flanges 38, which have sliding bearing on the rear marginal parts of the top and bottom magazine frame members 26—27. As shown in Figures 8 and 12, the top and bottom edges of the plate changer are preferably reinforced and stiffened by bars 39. To the right hand end of said plate-changer is secured an end member 40, which, when the plate-changer is in its normal position, closes the opening in the magazine casing which gives access to the plate compartment. A collapsible bag 41 is secured to said end member 40 and to the part of the casing 17 about the opening which it closes, in order to seal the plate-changer against the entrance of light during the operation of the plate-changer. A finger-hold plate 42, attached to the outer face of the end member 40 serves as a grip to operate the plate changer.

At the inner end of the plate-changer is an extension 43 which carries a spring controlled abutment 44 adapted to rock upon a vertical axis. Said abutment, when the plate-changer is in its normal position, stands in line with and adjacent to the flange 35 of the rearmost septum in the magazine and when the plate-changer is withdrawn from the casing 17, said abutment will engage said flange and force the septum out with the plate-changer.

45 indicates an upright rock shaft which is journalled in the brace bars 39 of the plate changer near its inner end. The top end of said shaft is bent forwardly to provide a rock arm 46. Vertically spaced, horizontal arms 47, are fixed to the shaft and extend toward the outer end of the plate-changer. The free ends of said arms are pivotally connected to the inner end of a shifter plate 48, which normally stands back of the rearmost septum in the magazine. At the outer end of said plate is a hooked flange 49, which, when the plate changer is in its normal position in the casing 17, will engage the outer edge of the rearmost septum. A coiled, contractile spring 50 connects the shaft 45 with a point on the shifter plate 48 located a somewhat greater distance from said shaft 45 than the axes of the pivotal connections of the arms 47 with said plate. This spring acts to assist in moving the shifter plate from its parallel position with respect to the plate-changer 36, to the position shown in Figure 5. The outer end of the shifter plate is normally engaged beneath a hook 51 on the plate changer.

Upon withdrawal of the plate-changer, just as it approaches the outermost limit of its movement, the arm 46 of the rock shaft 45 will engage a fixed pin 52 (see Figure 11) depending from the top wall of the casing 17, whereupon a further withdrawal will rock the shaft 45 to swing the arms 47 forwardly and with them, the inner end of the shifter plate into the position shown in Figure 5, the spring 50 assisting as before pointed out.

There is mounted on the vertical wall 29 of the magazine frame adjacent to the wall 19 of the casing 17, a vertically extending spring controlled guide roller 53. Said roller is spaced from the said wall a distance sufficient for the end 35 of the septum to be engaged between it and the wall 19, when said septum end (the septum having been swung into the position shown in Figure 5 as last stated) is moved inwardly in the initial movement of the plate shifter 36, upon its return movement to its normal, closed position.

Said roller 53 is mounted in any suitable manner, so as to yield somewhat away from the wall 19, and inwardly toward the center of the casing, to permit the septum to be moved and guided between it and said adjacent wall 19, towards and finally into a position parallel to said wall,—said roller holding the septum against said wall 19 during this movement. As shown, said roller is mounted in a swinging frame 54, which is fixed to an upright shaft 55, journaled in ears 56, extending horizontally from the vertical wall 29. A vertically disposed flat spring 57, fixed at the bottom to the side wall 29 of the magazine frame, has its top end engaged against a horizontal arm 58 at the top of the shaft 55,—said spring providing for the yielding movement of the roller frame 54.

When the plate changer has been moved inwardly a certain distance, the septum, by reason of its engagement between the roller 53 and the wall 19 (which is also curved forwardly toward the opening 22 as indicated at 19ˣ, Figures 2 and 3) will be swung into and held in a plane parallel with and adjacent to said wall 19. Upon further inward movement of the plate changer, the outer end of said septum will be engaged by inwardly extending top and bottom pusher bars 59, provided on the end member 40 of the plate changer, which pusher bars will complete the inward movement of the septum.

Figure 6:
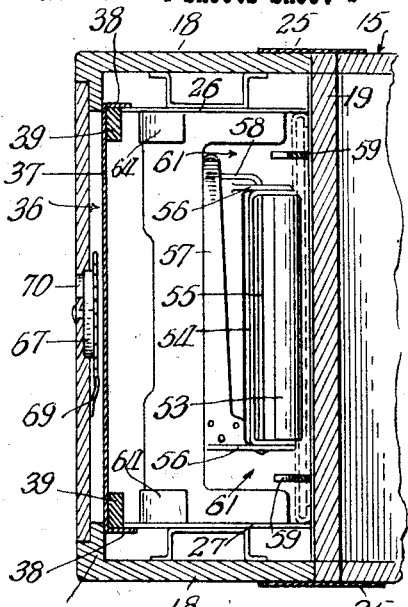
Figure 6 is a vertical section through the magazine casing and plate changing device, in a plane indicated by the line 6—6 of Figure 2.

As the plate changer is moved inwardly, the arm 46 of the shaft 45 will strike the outer end of a flanged plate 60 (see Figures 8 and 11) fixed to the rear margin of the top wall 26 of the magazine frame. This will produce a rocking movement of the shaft 45 so as to swing the shifter plate 48 back into its original position, parallel with the body 37 of the plate changer. Openings 61 (see Figure 6) are provided in the vertical magazine wall 29, in line with the pusher bars 59, which are located above and below the roller 53, so as to permit said pusher bars to move the septum into the desired position with its center in the focal line of the camera. When the outer end of the septum passes the roller 53, said roller will be returned by the spring 57, to its normal position; the spring controlled abutment 44, on the plate changer, will yield to pass behind the rearmost septum in the stack, and when the plate changer has come to its normal position, will snap into engagement with the inner end 35 of said septum; and the hook 49 on the plate shifter 48, will engage the front end of said septum—the parts being thus all in their normal, original position and ready to make another exposure. The cycle of operations described is, of course, repeated after each exposure.

To hold the rearmost plates in their upright position when the plate changer is in its outward position, I provide a yielding swinging arm 62 (see Figures 9 and 11) which is pivoted at 63 to the magazine frame. This arm is adapted to be engaged by the inner end of the plate changer as it moves inwardly to move it out of the way and will automatically swing into its upright position upon outward movement of the plate changer.

In order to keep the septums in the stack in line as they are shifted rearwardly in the magazine frame, I preferably provide spring fingers 64, 64, at the top and bottom and adjacent to the wall 29 of the magazine frame, which yieldingly engage the outer edges of the septums 30, and hold them against lateral shifting movement.

Figure 7:
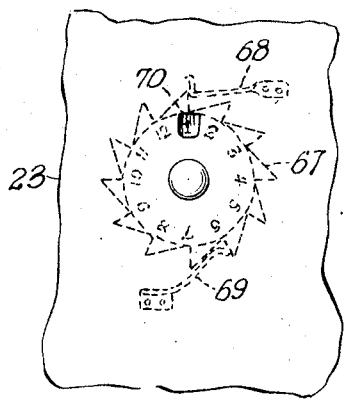
Figure 7 is a detail view of a plate counting device embodied in my invention and which will be more specifically referred to later.
Figure 11:
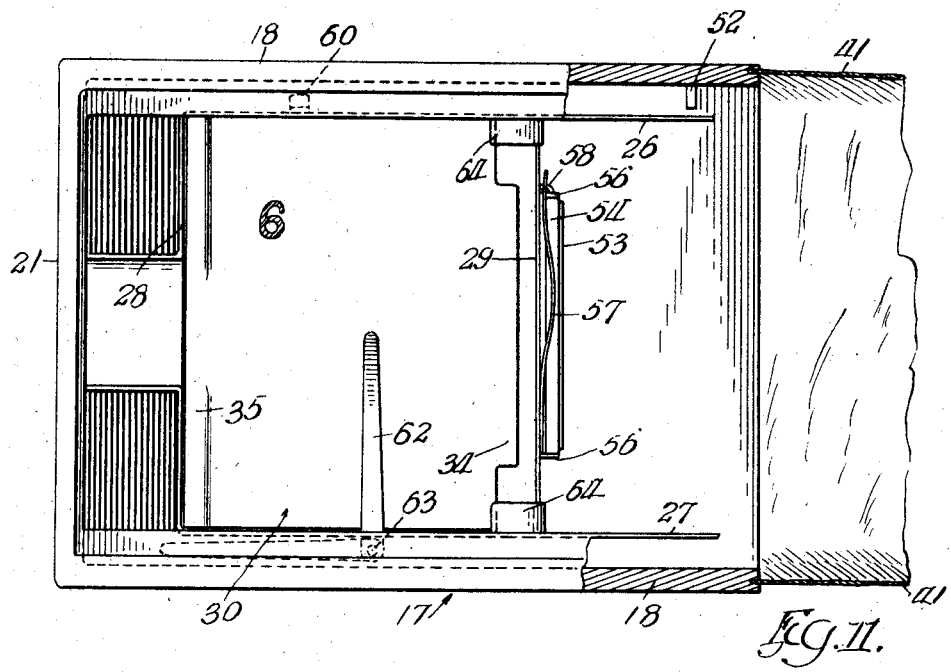
Figure 11 is a rear end elevation of the magazine casing with parts broken away, and the plate changing device removed therefrom.

To keep track of the number of plates exposed, each septum carries a number such as the number "6", as shown in Figure 11, arranged in line with a hole 65 in the plate changer 36, (see Figure 12) and a ruby glass sight opening 66 in the door 23. Said door also carries a rotative ratchet counter wheel 67 (see Figure 7) which is actuated by a spring pawl 68 carried by the plate changer, as said changer is moved inwardly—a second pawl 69 on the door holding the ratchet wheel against backward movement. Said ratchet has numbers, one for each plate, which numbers are visible through a second but smaller opening 70 in the door 23.

When all the plates have been exposed, the plate changer is moved outwardly, after which the door 23 is opened and the septums removed therethrough. The exposed plates are removed from the septums and new ones substituted therefor, after which all the septums are again replaced in the magazine as before.

While in describing my invention, I have referred to many details of construction and of arrangement, it will be understood that these are in no way material, and that the invention is not limited thereto in any manner except as may be pointed out in the appended claims.

I claim as my invention:

1. A plate changer of the kind described, comprising in combination with the magazine for a plurality of septums, a backing member normally providing the rear end of said magazine, said backing member having a yielding abutment adapted to engage one end of the rear septum, a swinging shifter plate associated with said backing member, adapted to shift a septum into position at an angle to said backing member, pusher members spaced forwardly from said backing member, and positive means associated with said shifter member controlled by the outward and inward movement of the plate changer for swinging said shifter member.

2. In a plate changer of the kind described, comprising in combination with a magazine for a plurality of septums, a backing plate adapted to engage the back face of the rearmost septum in the magazine, a yielding abutment on the inner end of said backing plate, a swinging shifter plate associated with said backing plate, adapted to shift a septum into position at an angle to said backing plate, a transverse end member on said backing plate at its outer end, pusher bars carried by said end member and located in a plane spaced from said backing plate, and positive means associated with said shifter member for swinging it from one position to another.

3. In a plate changer of the kind described, comprising a backing plate provided at its front end with a transverse end member, said backing plate having a rearwardly curved extension, a yielding abutment carried at the inner end of said backing plate, a shifter member having a hooked flange at its front end, a vertical rock shaft carried at the rear end of said backing plate, rock arms fixed to said shaft and having pivotal supporting connection with said shifter member, and a tension device connecting said rock shaft with a point on said shifter member beyond the common axis of the pivotal connection of said rock arms with said shifter member.

4. In a plate changer of the kind described, said plate changer having a backing plate, a plate shifter having a hooked flange at its outer edge normally standing in a position parallel to said backing plate, a vertical rock shaft having an operating arm at one end, horizontal rock arms having a pivotal supporting connection with the inner end of said plate shifter and a coiled spring connecting said rock shaft with a point of said plate shifter beyond the common pivotal axial connection of said rock arms with said plate shifter.

5. In a camera, in combination with a magazine for a plurality of septums and a plate changer for removing a septum at the back of said magazine and inserting it into a plane at the front end of said magazine, a guiding plate in a plane at the front end of said magazine, and a yielding antifriction device spaced back of said guiding plate, adapted to receive the inner end of a septum and guide and hold said septum in the plane of said guiding plate.

6. In a camera, in combination with a magazine open at the front, adapted to contain a plurality of septums and a plate changer for removing a septum from the rear end of said magazine and inserting it into a plane in front of said magazine, a guiding plate in the plane of the front end of said magazine, and a roller spaced back of said plate and mounted to yield in a direction away from said plate and towards said magazine, said roller being adapted to yieldingly guide a septum into the plane of said guiding plate and to hold it in said plane as it is moved into position at the front of the magazine.

In testimony that I claim the foregoing as my invention, I affix my signature in the presence of two witnesses, this 2nd day of November, A. D., 1920.

GEORGE W. KAUSER.

Witnesses:
T. H. ALFREDS,
CHRISTINA DEANS.